United States Patent [19]
Chiba et al.

[11] Patent Number: 6,002,887
[45] Date of Patent: Dec. 14, 1999

[54] VIEW FINDER

[75] Inventors: Toru Chiba; Jun Hirakawa, both of Tokyo, Japan

[73] Assignee: Asahi Kogaku Kogyo Kabushiki Kaisha, Tokyo, Japan

[21] Appl. No.: 08/959,078

[22] Filed: Oct. 28, 1997

Related U.S. Application Data

[63] Continuation of application No. 08/613,882, Mar. 11, 1996, abandoned.

[30]       Foreign Application Priority Data

Mar. 13, 1995   [JP]   Japan ................................. 7-081940

[51] Int. Cl.$^6$ ................................................. G03B 13/10
[52] U.S. Cl. ........................... 396/232; 396/296; 396/373
[58] Field of Search ..................... 354/475, 155, 354/219, 289.12, 472, 471, 473, 474; 396/281, 287, 288, 289, 290, 291, 292, 148, 150, 152, 373, 382, 84, 232, 296

[56]             References Cited

U.S. PATENT DOCUMENTS

| | | | |
|---|---|---|---|
| 4,142,786 | 3/1979 | Suzuki et al. ............................. | 354/32 |
| 4,294,529 | 10/1981 | Sato et al. ................................ | 354/53 |
| 4,374,612 | 2/1983 | Matsumura et al. ..................... | 354/53 |
| 4,555,170 | 11/1985 | Wakui et al. ............................ | 354/470 |
| 4,560,264 | 12/1985 | Kitazawa et al. ....................... | 354/219 |
| 4,829,492 | 5/1989 | Choi et al. .............................. | 367/110 |
| 4,921,342 | 5/1990 | Pringle .................................... | 352/171 |
| 5,066,968 | 11/1991 | Suzuki et al. ........................... | 354/400 |
| 5,121,232 | 6/1992 | Miyadera ................................. | 359/49 |
| 5,299,037 | 3/1994 | Sakata ..................................... | 359/41 |
| 5,341,231 | 8/1994 | Yamamoto et al. ..................... | 359/49 |
| 5,349,416 | 9/1994 | Hara ........................................ | 354/471 |
| 5,426,526 | 6/1995 | Yamamoto et al. ..................... | 359/82 |
| 5,442,523 | 8/1995 | Kashima et al. ........................ | 362/31 |
| 5,517,278 | 5/1996 | Takahara et al. ....................... | 354/471 |
| 5,537,184 | 7/1996 | Hasushita et al. ...................... | 354/471 |
| 5,572,283 | 11/1996 | Wakabayashi et al. ................. | 396/279 |
| 5,603,068 | 2/1997 | Aihara ..................................... | 396/287 |
| 5,666,576 | 9/1997 | Ohtake .................................... | 396/288 |
| 5,727,245 | 3/1998 | Asakura et al. ......................... | 396/436 |

FOREIGN PATENT DOCUMENTS 3-23421   1/1991   Japan .

OTHER PUBLICATIONS

*Electro–Optical Devices and Systems* by Karim, Mohammad A., PWS–KENT Publishing Co., pp. 273–278, 294–303, 1990.

*Primary Examiner*—Safet Metjahic
*Assistant Examiner*—Christopher E. Mahoney
*Attorney, Agent, or Firm*—Greenblum & Bernstein, P.L.C.

[57]             ABSTRACT

In a view finder having an objective lens, an indicator is provided in the vicinity of an image forming position of the objective lens. The indicator includes a liquid crystal cell having a pair of spaced first and second glass substrates with transparent electrodes. A transparent macromolecular substance having a liquid crystal dispersed therein is enclosed in the space between the first and second glass substrates. An eyepiece is provided through which an image formed by the objective lens can be viewed. Light sources are provided along side surfaces of the indicator to emit and make light incident upon the indicator.

21 Claims, 8 Drawing Sheets

PRIOR ART

VIEW FINDER

This application is a continuation of application Ser. No. 08/613,882, filed Mar. 11, 1996, now abandoned.

BACKGROUND OF THE INVENTION

1. Field of the Invention

The present invention relates to a view finder having a liquid crystal display (LCD) which indicates various information in the form of letters or numerals, etc.

2. Description of Related Art

Figure 13:
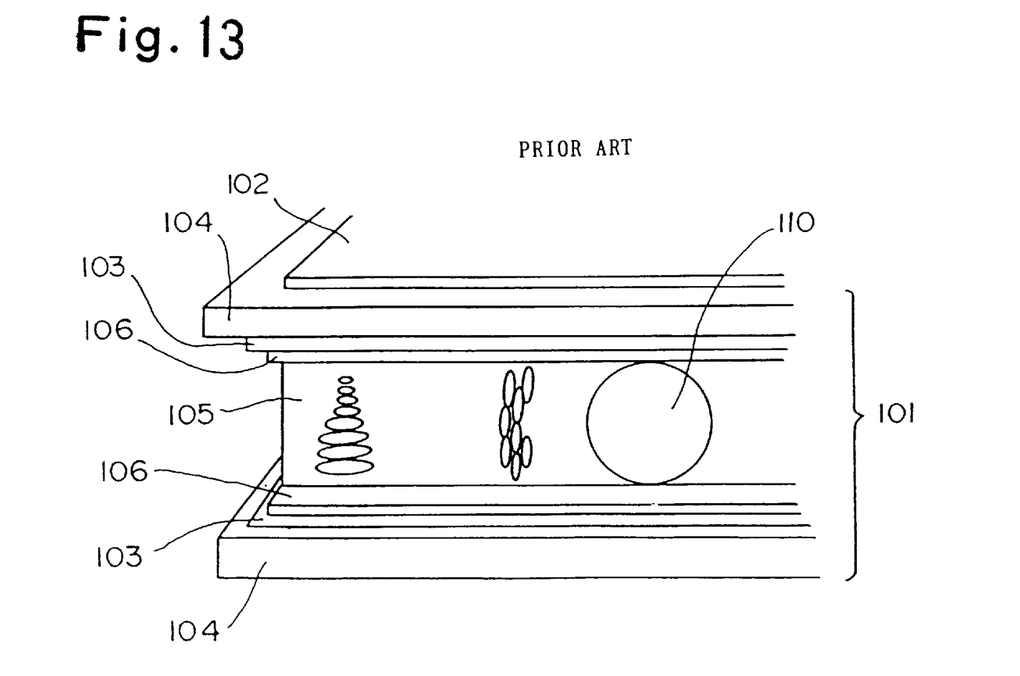
FIG. 13 is a perspective view of a known LCD.

A known liquid crystal display incorporated in a conventional view finder to display various information is constructed as follows (see FIG. 13).

A liquid crystal cell 101 (LC cell) includes a pair of glass substrates 104, each having a transparent electrode 103. A spacer 110, having a predetermined diameter, is provided between the glass substrates 104 to maintain a constant gap therebetween, and a liquid crystal 105 is enclosed between the glass substrates 104. Orientation films 106 are provided between the liquid crystal 105 and the respective transparent electrodes 103 to orient the liquid crystal molecules in a predetermined direction. A power source (not shown) is connected between the transparent electrodes 103. The glass substrates 104 are provided on the outer surfaces thereof with polarizing plates 102 (upper and lower polarizing plates) adhered thereto (note that only the upper polarizing plate is shown in FIG. 13).

When no voltage is applied to the LC cell 101, light incident upon the upper polarizing plate 102 is transmitted through the LC cell 101, including the lower polarizing plate 102, so that a transparent indication results. Conversely, if a voltage is applied to the LC cell 101, light incident upon the upper polarizing plate 102 is transmitted through the LC cell 101, but cannot pass through the lower polarizing plate 102, resulting in a black (opaque) indication.

However, in an LCD incorporated in a conventional view finder system, a complicated structure is required, and this results in a high manufacturing cost and leads to an increase in the size of the view finder system.

Moreover, in the conventional LCD, since external ambient light is used to indicate information, a clear indication can only be obtained when the finder system is used in a bright place. Namely, when the finder system is used in a dark place, no or little information can be indicated.

SUMMARY OF THE INVENTION

It is a primary object of the present invention to provide a view finder having a simple structure and in which information can always be clearly indicated in the view finder, regardless of the ambient light conditions.

To achieve the object mentioned above, according to an aspect of the present invention, in a view finder including an objective optical system, an indicator is provided in the vicinity of an image forming position of the objective optical system. The indicator comprises a liquid crystal cell having a pair of spaced first and second glass substrates with transparent electrodes. A transparent macromolecular substance, having a liquid crystal dispersed therein, is enclosed in the space between the first and second glass substrates. An ocular optical system is provided through which an image formed by the objective optical system can be viewed. At least one light source is provided along a side surface of the indicator, which emits and makes light incident upon the indicator.

Preferably, the liquid crystal is a P-type liquid crystal, whose refractive index for ordinary rays is substantially identical to that of the transparent macromolecular substance.

Alternatively, the liquid crystal can be an N-type liquid crystal, whose refractive index for extraordinary rays is substantially identical to that of the transparent macromolecular substance.

The transparent electrodes are adhered to the first and second glass substrates, and may respectively comprise a first and second group of electrode elements. The electrode elements of the first group are arrayed in a direction different from the direction in which the electrode elements of the second group are arrayed, preferably, in a direction perpendicular to the electrode elements of the second group.

In an embodiment of the present invention, the light source is disposed in the vicinity of the side surface of the indicator.

The indicator can be provided, on the light incident side surface thereof adjacent to the light source, with a light scattering surface or a light scattering member.

The indicator is preferably provided, on the side surface thereof that is located away from the light source, with a light reflecting member, which can be a metal film adhered to the side surface of the indicator. Alternatively, this side surface could be a smooth surface.

According to another aspect of the present invention, there is provided a view finder is provided, which comprises an objective optical system. A liquid crystal display is provided in the vicinity of an image forming position of the objective optical system. A pair of spaced first and second glass substrates are included in the liquid crystal display. The glass substrates are rectangular and have four side (end) surfaces when viewed from above. A transparent macromolecular substance, having a liquid crystal dispersed therein, is enclosed in the space between the first and second glass substrates. An ocular optical system is also provided through which an image formed by the objective optical system can be viewed. At least one light source is arranged to oppose one of the four side surfaces of the glass substrates, so that light emitted from the light source made incident upon one of four side surfaces passes along the glass substrates.

Preferably, the liquid crystal is a P-type liquid crystal whose refractive index for ordinary rays is substantially identical to that of the transparent macromolecular substance. Alternatively, the liquid crystal could be an N-type liquid crystal whose refractive index for extraordinary rays is substantially identical to that of the transparent macromolecular substance.

The view finder could be a real image type view finder of either a compact camera or a single lens reflex camera.

Preferably, transparent electrodes are adhered to the first and second glass substrates, and comprise a first and a second group of electrode elements, espectively. The electrode elements of the first group are rrayed in a direction normal to the direction in which the electrode elements of the second group are arrayed.

A light reflecting member is provided on a surface of the glass substrate which has no light source.

At least one polarizing plate may be provided between the light source and the glass substrate, so as to make a light flux passing therethrough into a linearly polarized light flux having an oscillation direction parallel to the surface of the glass substrate.

The present disclosure relates to subject matter contained in Japanese Patent Application No. 7-81940 (filed on Mar.

13, 1995) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Embodiments of the present invention will now be discussed below.

Figure 1:
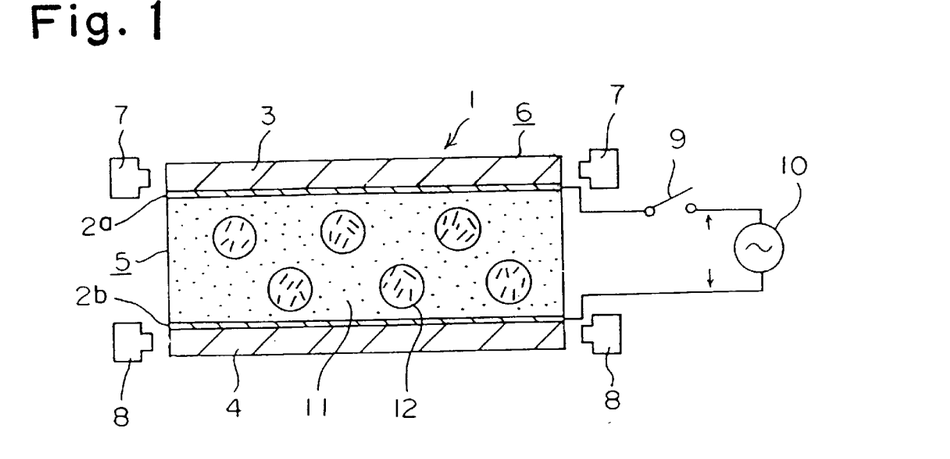
FIG. 1 is a sectional view of a liquid crystal display (LCD) according to a first embodiment of the present invention.
Figure 2:
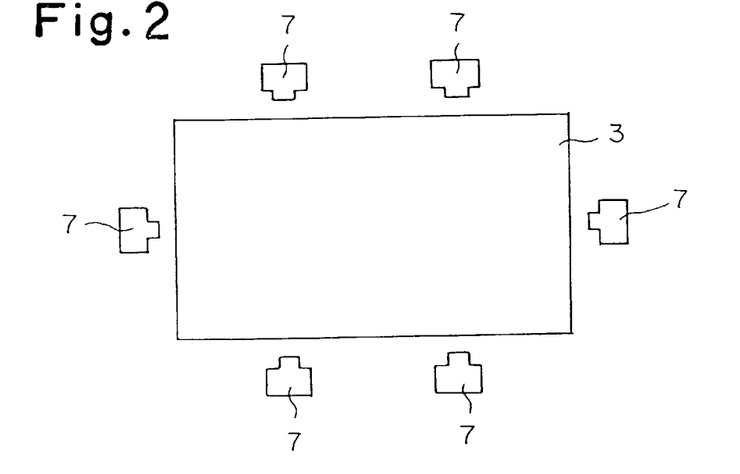
FIG. 2 is a plan view of the LCD shown in FIG. 1.

FIGS. 1 and 2 respectively show a sectional view and a plan view of a liquid crystal display (LCD) which constitutes a view finder according to a first embodiment of the present invention. FIG. 1 shows an LCD 1 having a liquid crystal cell 6 (LC cell) which is provided with a pair of glass substrates 3, 4 having transparent electrodes 2a, 2b adhered thereto. A spacer (not shown), made of particles and having a predetermined diameter, is provided between the pair of glass substrates 3, 4 so as to maintain a gap therebetween. A macromolecule dispersion liquid crystal 5 is enclosed between the glass substrates 3, 4. The macromolecule dispersion liquid crystal 5 is made of a macromolecular member 11 having liquid crystal molecules 12 (LC molecules) dispersed therein. The glass substrates 3, 4 are of rectangular shape having four side (end) surfaces (FIG. 2), and light sources 7, 8 are provided opposed to the side surfaces of the glass substrates.

The transparent electrodes 2a, 2b are each composed of a plurality of electrodes, as will be discussed hereinafter. However, for clarity it is assumed that each of the electrodes 2a, 2b is provided with one electrode, in the following discussion.

The refractive indexes of the glass substrate 3 and the macromolecule dispersion liquid crystal 5 (macromolecular member 11 and LC molecules 12) are determined such that light incident upon the outer surface of the glass substrate 3 passes therethrough and enters the macromolecule dispersion liquid crystal 5, and light incident upon the side surface of the glass substrate 3, from the light source 7, passes in the glass substrate 3 along the plate surface thereof, and enters the macromolecule dispersion liquid crystal 5. The same is equally true in the relationship between the glass substrate 4 and the macromolecule dispersion liquid crystal 5.

To this end, the refractive index of each element satisfies the following relationship:

$$n_g < n_o, n_e, n_p \quad (1)$$

wherein, "$n_o$" designates the refractive index of the LC molecules 12 with respect to ordinary rays of light, "$n_e$" the refractive index of the LC molecules 12 with respect to extraordinary rays of light, "$n_g$" the refractive index of the glass substrate 3, and "$n_p$" the refractive index of the macromolecular member 11.

The material of which the macromolecular member 11 is made and the material of the LC molecules 12 have the following refractive index relationship. Namely, for a P-type liquid crystal:

$$n_p \approx n_o \quad (2)$$

When this relationship is established, if a voltage is applied to the LC cell 6, the latter becomes transparent. It should be noted that a characteristic of the P-type liquid crystal is that dielectric anisotropy ($\Delta_E$) thereof is positive (i.e., $\Delta_E > 0$).

For an N-type liquid crystal:

$$n_p \approx n_e \quad (3)$$

When this relationship is established, if a voltage is applied to the LC cell 6, the LC cell 6 becomes transparent. It should be noted that a characteristic of the N-type liquid crystal is that dielectric anisotropy ($\Delta_E$) thereof is negative (i.e., $\Delta_E < 0$).

A light emitting diode (LED) can be advantageously used as the light sources 7, 8. Preferably, a plurality of light sources 7 are provided on each side (end) surface of the rectangular glass substrate 3, as shown in FIG. 2, to ensure that light can be made incident upon the glass substrate 3 along a plane direction of the substrate 3. Similarly, a plurality of light sources 8 are provided on each side of the rectangular glass substrate 4. The arrangement of the light sources 7, 8 ensures that a large quantity of light can be made incident upon the side (end) surfaces of the glass substrates 3, 4 and that the incident light can be distributed uniformly in the glass substrates 3, 4.

It should be noted that it is possible to dispense with one of the light sources 7 or 8.

The light sources 7 and 8 are preferably opposed to the four side (end) surfaces of each of the glass substrates 3 and 4 in the illustrated embodiment, as mentioned above. However, the arrangement and the structure of the light sources is not limited to that shown in the illustrated embodiment, so long as a large quantity of light can be made incident upon the side (end) surfaces of the glass substrates 3 and 4 and the incident light can be uniformly distributed in the glass substrates 3 and 4.

The operation of the LCD 1 will now be discussed with reference to FIGS. 3 and 4. In the following discussion it is assumed that the LCD 1 is comprised of a P-type liquid crystal, and that the electrodes 2a and 2b are connected to an AC (alternating current) source 10 through a switch 9, as shown in FIG. 1.

If a sufficient quantity of natural ambient light or external illuminating light is made incident upon the outer surfaces of the glass substrates 3 and 4, no light is emitted from the light sources 7 and 8. In this case, the light incident upon the outer surfaces of the glass substrates 3,4 passes therein and reaches the macromolecule dispersion liquid crystal 5.

If the switch 9 is turned OFF, no AC voltage V is applied from the power source 10 to the LC cell 6. As a consequence, the optical axes (longitudinal axis directions) of the LC molecules 12 are random (FIG. 3B). Hence, the light is dispersed at the boundary portions of the LC molecules 12 and the macromolecular member 11, so that the light transmittance is decreased, as shown in FIG. 4A. Thus, an opaque or black indication is produced in the LC cell 6.

Figure 3A:
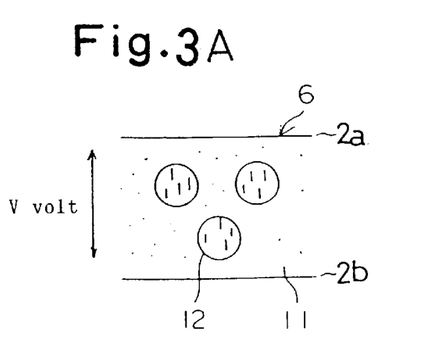
FIGS. 3A and 3B are explanatory views of an LCD when a voltage is applied and is not applied to a liquid crystal cell, respectively.
Figure 3B:
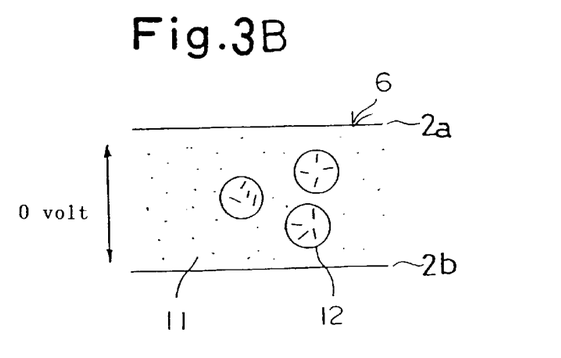
Figure 4A:
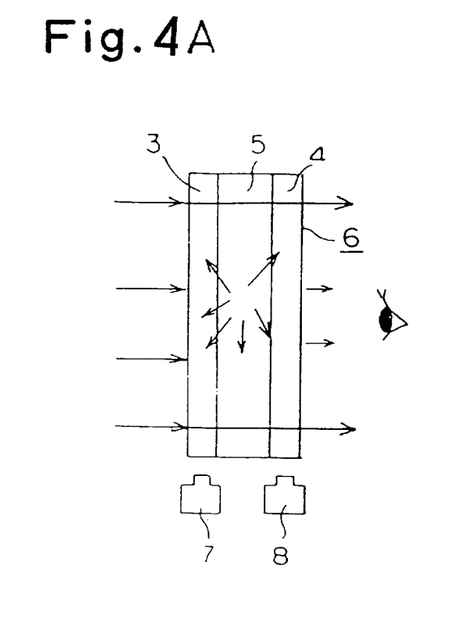
FIGS. 4A and 4B are explanatory views of an indication state of a liquid crystal cell.

If the switch 9 is turned ON, an AC voltage V of the power source 10 is applied to the LC cell 6, so that the longitudinal axes of the LC molecules 12 are oriented in the direction of the electric field, as shown in FIG. 3A. The light can pass therethrough without substantially being dispersed at the boundary portions of the LC cell 6 and the macromolecules. Thus, a transparent indication is produced in the LC cell 6.

If the quantity of natural ambient light or external illuminating light is insufficient, a sufficient quantity of light cannot be made incident upon the outer surfaces of the glass substrates 3, 4. In this case, the light sources 7, 8 are actuated to emit auxiliary light.

Figure 4B:
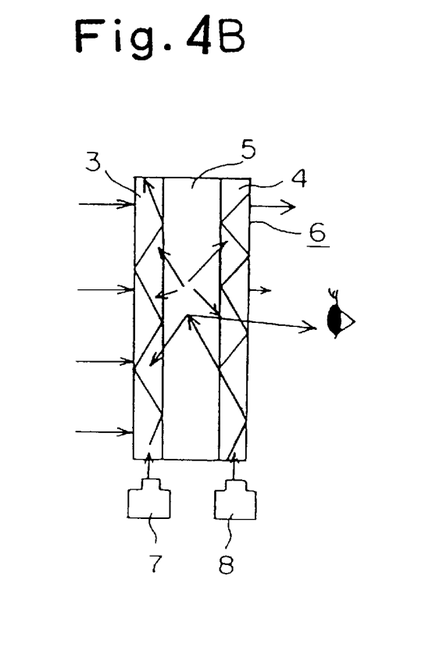

The light emitted from the light sources 7, 8 and made incident upon the side surfaces of the glass substrates 3, 4, is repeatedly reflected by the inner and outer boundary surfaces thereof before entering the macromolecule dispersion liquid crystal 5, as shown in FIG. 4B.

If the switch 9 is turned OFF, no AC voltage V is applied from the power source 10 to the LC cell 6. As a consequence, the optical axes (longitudinal axis directions) of the LC molecules 12 are random (FIG. 3B). Hence, the light is dispersed at the boundary portions of the LC molecules 12 and the macromolecular member 11, so that an opaque or black indication appears in the LC cell 6.

If the switch 9 is turned ON, an AC voltage V of the power source 10 is applied to the LC cell 6, so that the longitudinal axes of the LC molecules 12 are oriented in the direction of the electric field, as shown in FIG. 3A. The light can pass therethrough without substantially being dispersed at the boundary portions of the LC cell 6 and the macromolecules. In addition, the light incident upon the surfaces of the glass substrates 3, 4 are also transmitted therethrough, thus, a transparent indication is produced in the LC cell 6.

As can be understood from the above discussion, in the LCD 1 mentioned above, a clear indication can be obtained regardless of the condition of the light. Moreover, since no polarizing plate is needed in the LCD 1 according to the embodiment mentioned above, the light utilization efficiency can be enhanced, thus resulting in information being more clearly indicated.

The LC cell 6 of the LCD 1 shown in FIGS. 1 and 2 can be produced as follows, by way of example.

BL008 ($n_o$=1.527, $n_e$=1.807) produced by BDH Co Ltd., is used for the liquid crystal member, and UV (ultraviolet) setting resin, produced by Norland Corp under the trade name of NAO65 ($n_p$=1.524) is used for the macromolecule member. A mixture of 50% by weight of BL008 and 50% by weight of NAO65 is prepared and stirred.

Thereafter, the mixture thus obtained is introduced in a space defined between the two glass substrates ($n_g$=1.516) 3 and 4, to which the transparent electrodes 2a and 2b have been adhered, so that the space between the glass substrates is filled with the mixture. To provide a predetermined width of space between the glass substrates, the substrates are held by an appropriate means or a spacer member is provided between the glass substrates.

After the space has been filled with the mixture, the mixture (filler) is illuminated with UV light to set the macromolecule member to thereby stabilize the filler in the gap (space) between the glass substrates 3 and 4. Consequently, as shown in FIG. 1, the LC molecules 12 are dispersed in the macromolecule member 11. Thus, an LC cell 6 having a predetermined thickness of macromolecule dispersion liquid crystal 5 is obtained.

Note that the size of the LC molecules 12 can be optionally controlled by varying the intensity of the UV light emitted to set the macromolecule member.

The weight ratio of the LC material to the macromolecule member can be optionally selected in the range of 5–80 (%). The quantity of the UV light to be emitted can be optionally selected in the range of 5–50 $mW/cm^2$. The distance (gap) between the glass substrates 3 and 4 can be optionally selected within 3–50 $\mu$m.

Experimental results of the LC cell 6 will be described below.

In the experiment the weight ratio between the liquid crystal and the macromolecular member was 50:60; the thickness of the macromolecule dispersion liquid crystal 5 was 8 $\mu$m; and the diameter of the LC molecules 12 was 1 to 3 $\mu$m. The voltage applied to the LC cell 6 and the light transmittance were measured (shown in FIG. 5).

Figure 5:
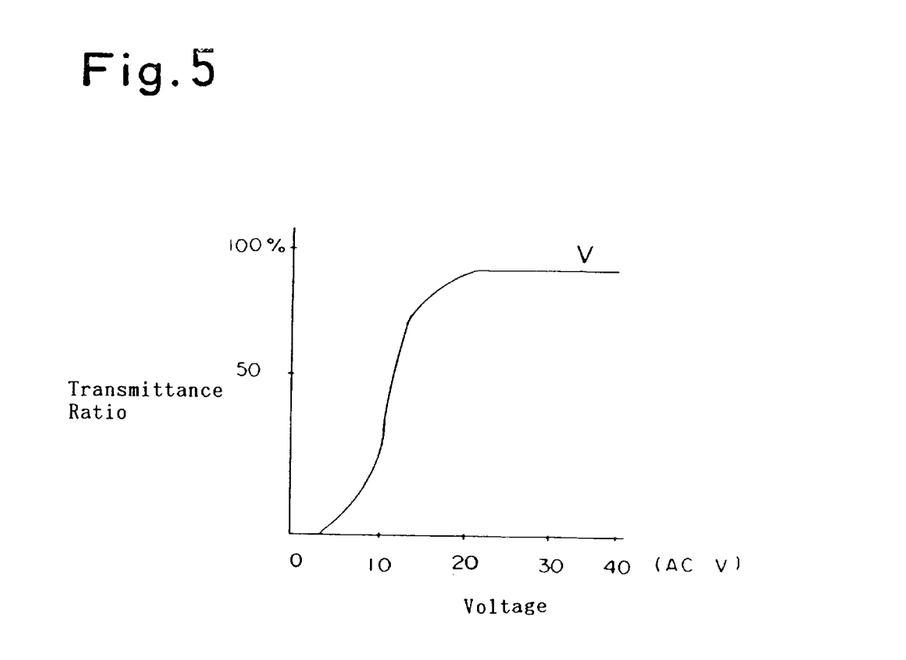
FIG. 5 is a graph showing a relationship between a voltage applied to a liquid crystal cell and transmittance.

As shown in FIG. 5, when the voltage applied to the LC cell 6 was (approximately) zero, and the transmittance was zero. When the applied voltage was gradually increased from 0 V, the transmittance gradually increased from zero before suddenly increasing at an intermediate value, as shown in FIG. 5. The transmittance was saturated when the applied voltage was more than approximately 20 V.

Note that the materials of the liquid crystal and the macromolecular member are not limited to those mentioned above. For example, BL034, BL035, BL036, or ML-1003, etc., produced by Melc Inc., can be used for the liquid crystal, and acrylic resin, methacrylic resin, urethane acrylate resin, epoxy resin, or epoxy acrylate resin, etc., can be used for the macromolecular member.

Figure 6:
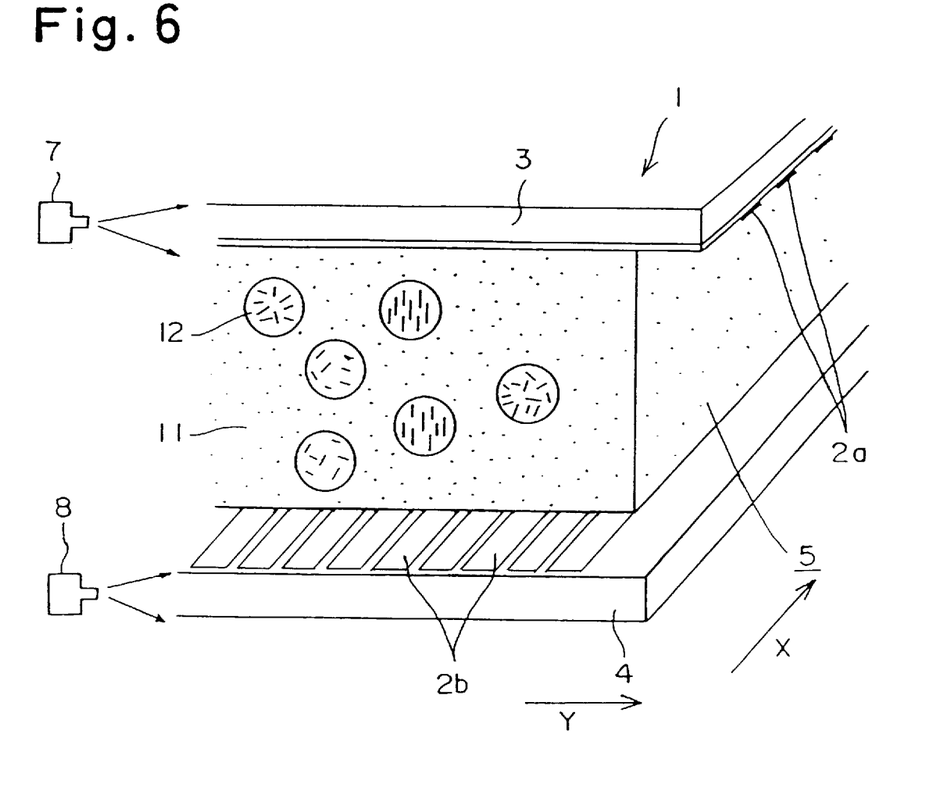
FIG. 6 is an enlarged perspective view of a transparent electrode which constitutes the LCD shown in FIG. 1.

The following discussion will be addressed to the transparent electrodes 2a and 2b. In the LC cell 6 shown in FIG. 1, the transparent electrode 2a comprises a plurality of elongated transparent electrode elements (signal electrodes) which extend in the direction Y (FIG. 6) and which are spaced at a predetermined distance in the direction X perpendicular to the direction Y (FIG. 6). The transparent electrode 2b comprises a plurality of elongated transparent electrode elements (scanning electrodes) which extend in the direction X and which are spaced at a predetermined distance in the direction Y in a matrix arrangement, to indicate information in the form of letters or numerals etc.

Consequently, when the scanning voltage is successively applied to the electrode elements of the electrode 2b, and the signal voltage is applied to the selected electrode elements of the electrode 2a, the split areas of the liquid crystal 5 are selectively made transparent or opaque to indicate information in the form of letters or numerals, etc.

Figure 7:
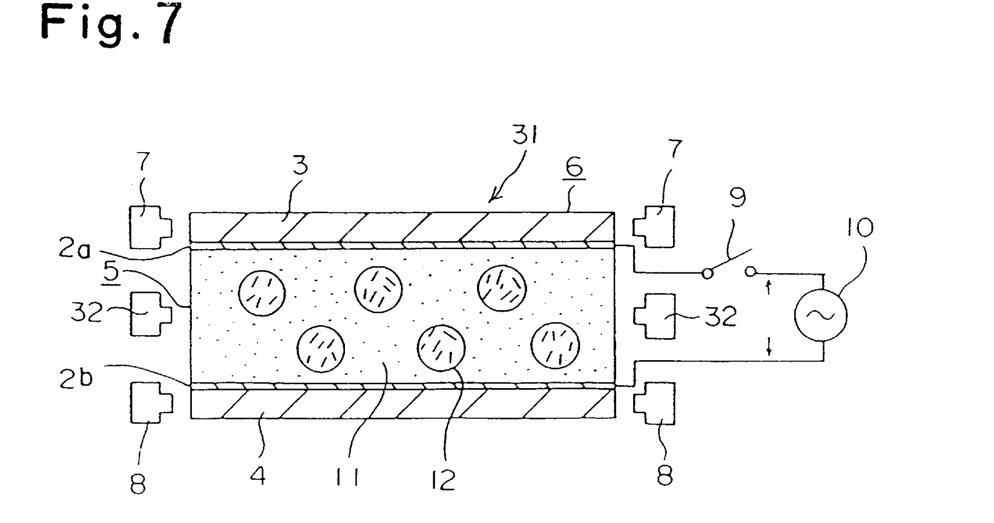
FIG. 7 is a sectional view of an LCD according to another embodiment of the present invention.

FIG. 7 shows a second embodiment of an LCD in which, in addition to the light sources 7 and 8 opposed to the side (end) surfaces of the pair of glass substrates 3 and 4 in the first embodiment, light sources 32 are opposed to the side surfaces of the macromolecule dispersion liquid crystal 5, to improve indication capability when in a dark location. The remaining structure of the second embodiment is substantially the same as that of the first embodiment. In FIG. 7, elements corresponding to those in the first embodiment are designated with like reference numerals, and thus no detailed explanation will be given.

In the LCD 31 shown in FIG. 7, light emitted from the light sources 7 and 8 and made incident upon the side (end) surfaces of the glass substrates 3 and 4, passes through the plates of the glass substrates 3 and 4 and enters the macromolecule dispersion liquid crystal 5. Light emitted from the light sources 32 and made incident upon the side surfaces of the macromolecule dispersion liquid crystal 5 passes therein while being repeatedly reflected by the inner surfaces of the glass substrates 3 and 4. Consequently, when the light emitted from the light sources 7 and 8 is scattered by the liquid crystal molecules, the light emitted from the light sources 32 is also scattered by the LC molecules. Thus, the LC cell 6 can be more clearly and more brightly indicated.

Figure 8:
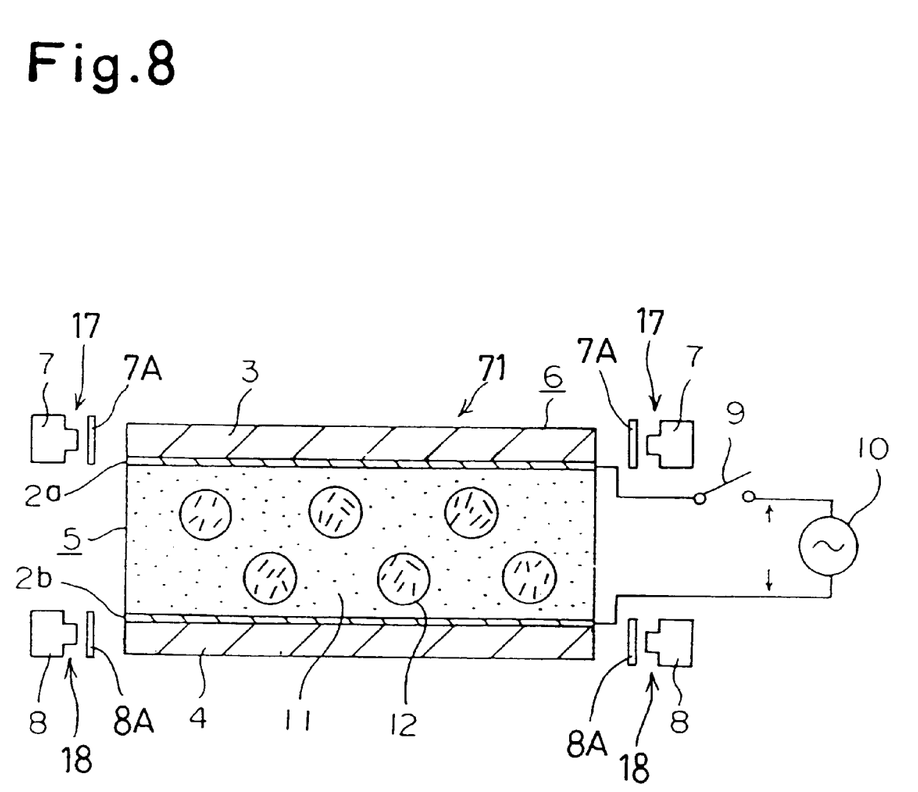
FIG. 8 is a sectional view of an LCD according to a further embodiment of the present invention.

FIG. 8 shows a third embodiment of an LCD 71 in which light source units 17 and 18, respectively, comprise the light sources 7 and 8 and polarizing plates 7A and 8A. The polarizing plates 7A and 8A are arranged to be normal and adjacent to the optical axes of the light sources 7 and 8 so that light, emitted from the light sources 7 and 8, passes through the polarizing plates 7A and 8A, and becomes a linearly polarized light flux, the oscillation direction of which is parallel to the surface of the glass substrates 3, 4. The remaining structure of the third embodiment is substantially the same as that of the first embodiment. In FIG. 8, elements corresponding to those in the first embodiment are designated with like reference numerals, and thus no detailed explanation will be given.

In this embodiment, similar to the first and second embodiments, if the switch 9 is turned OFF, the light is dispersed at the boundary portions of the LC molecules 12 and the macromolecular member 11, so that the light transmittance is decreased, thus, an opaque or black indication is produced in the LC cell 6. If the switch 9 is turned ON, the light can pass therethrough without being substantially dispersed at the boundary portions of the LC cell 6 and the macromolecules. Thus, a transparent indication is produced by the LC cell 6. According to the present embodiment, since light incident upon the glass substrates 3, 4 is a linearly polarized light flux, a difference in brightness between the opaque indication and the transparent indication becomes large. Thus, a high contrast indication of the LC cell 6 is obtained.

Figure 9:
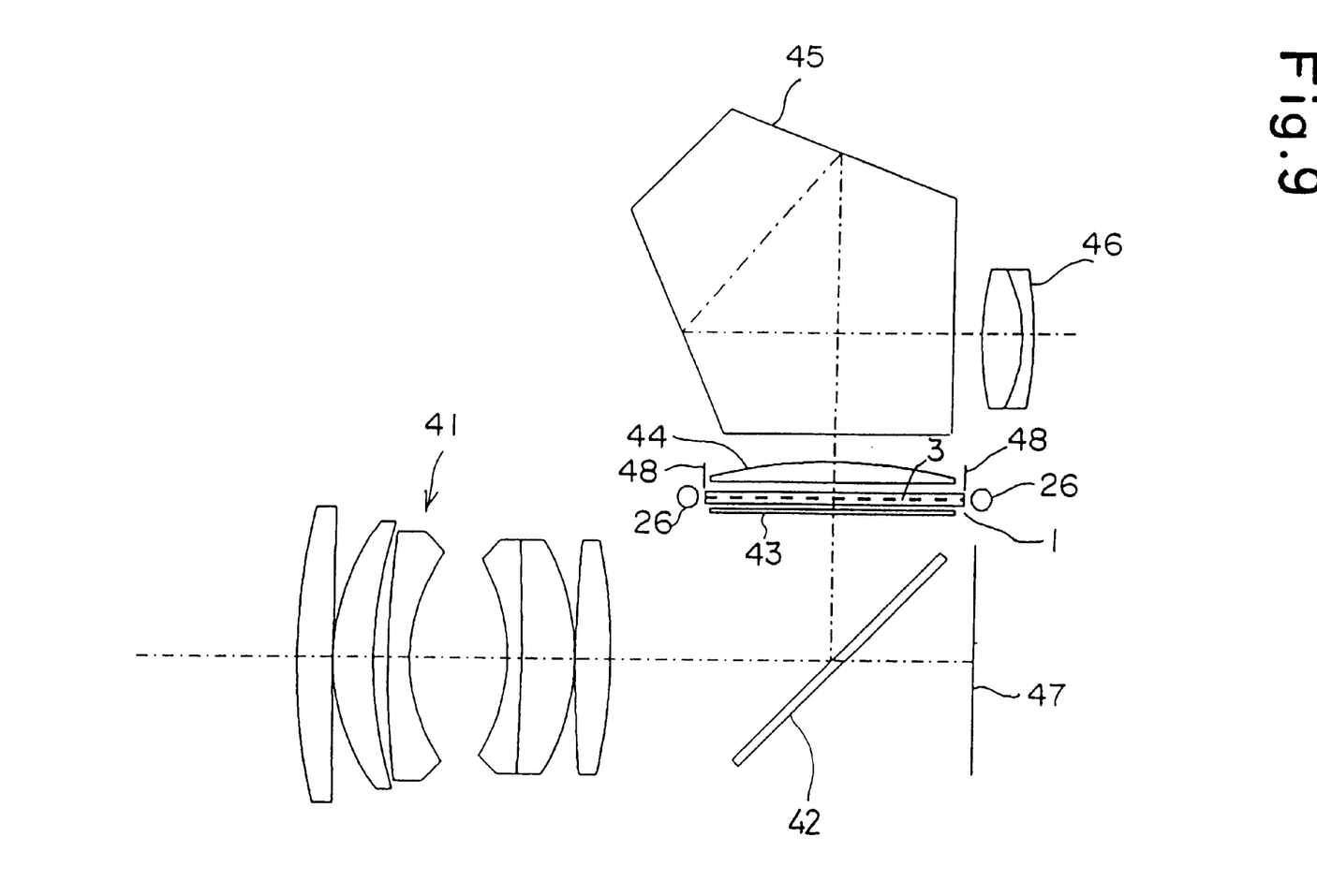
FIGS. 9 and 10 are schematic views of a view finder in a single lens reflex camera having an LCD.

FIG. 9 shows an optical system of a view finder of a single lens reflex camera having an LCD as constructed above and incorporated therein (FIGS. 1 and 6).

In FIG. 9, 41 designates a photographing lens comprising a plurality of lens elements. A diaphragm (not shown) is provided between the lens elements. The light transmitted through the photographing lens 41 is reflected by a main mirror 42 and is converged onto a focusing plate 43 to form an image. The image can be observed through an eyepiece 46 by a photographer, after passing through the LCD 1, a condenser lens 44, and a pentagonal prism 45. Note that 47 designates an image forming surface.

Light sources 26 correspond to the light sources 7 and 8 shown in FIG. 1. A light intercepting plate 48 is provided to surround the peripheral edge of the glass substrate 3 of the LCD 1 to intercept the light emitted from the light source 26 toward the surface of the glass substrate.

Since the view finder of a camera, as constructed above, is provided with the LCD 1, information (e.g., photographing information) can be clearly indicated in the view finder regardless of the condition of the light at the photographing location. Thus, the operability of the camera can be increased.

Figure 10:
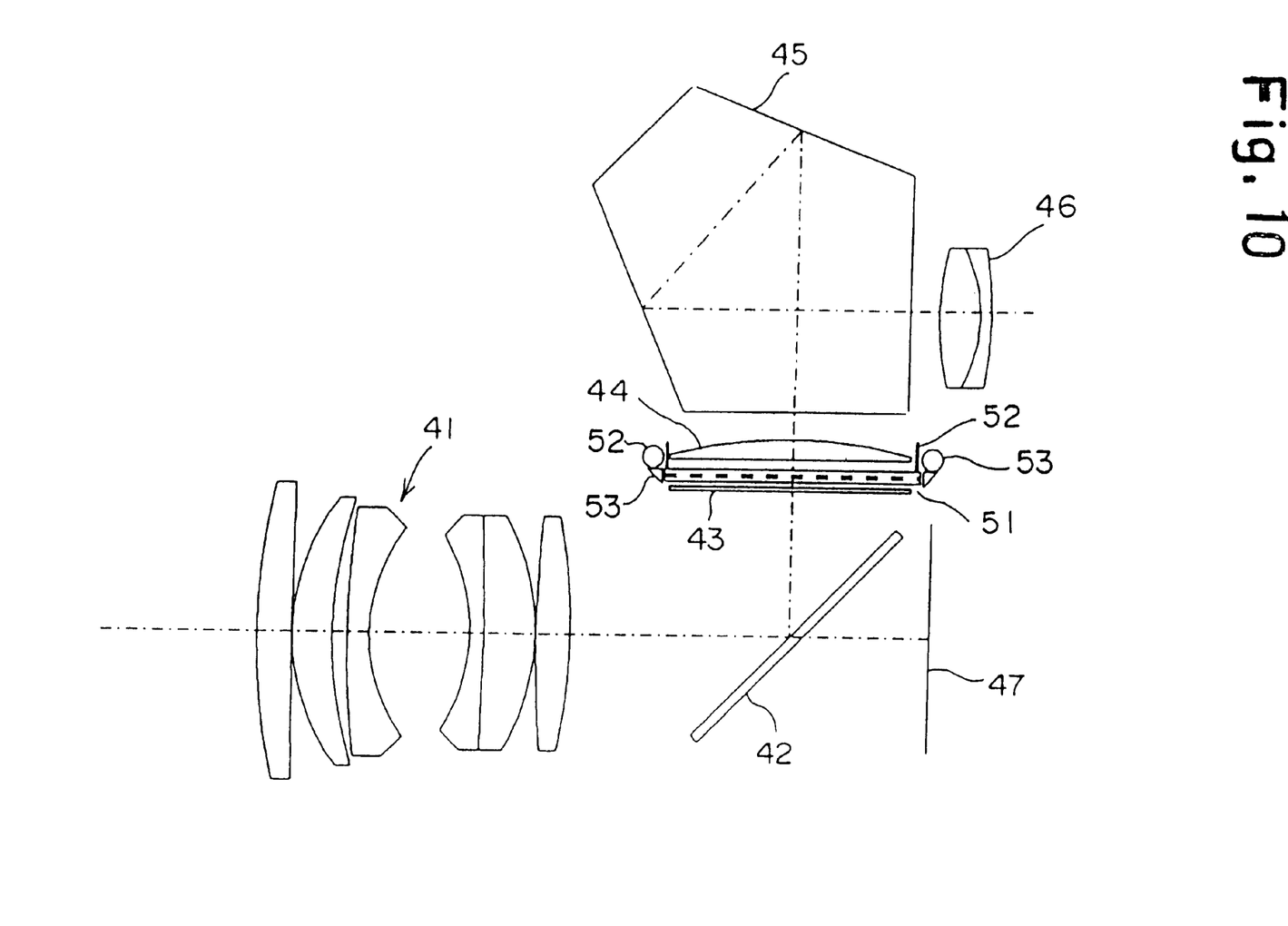

FIG. 10 shows a view finder of a single lens reflex camera having an improved LCD 51. Unlike the first embodiment of the LCD 1 in which the light emitted from the light sources 7, 8 is made directly incident upon the glass substrates 3 and 4, the LCD 51 includes a prism 53 through which the light emitted from the light sources 52 is made incident upon the side (end) surfaces of the glass substrates 3 and 4. The remaining structure of the embodiment illustrated in FIG. 10 is substantially the same as that of FIG. 9. In FIG. 10, those components corresponding to those in FIG. 9 are designated with like reference numerals and thus no explanation will be given.

Figure 11:
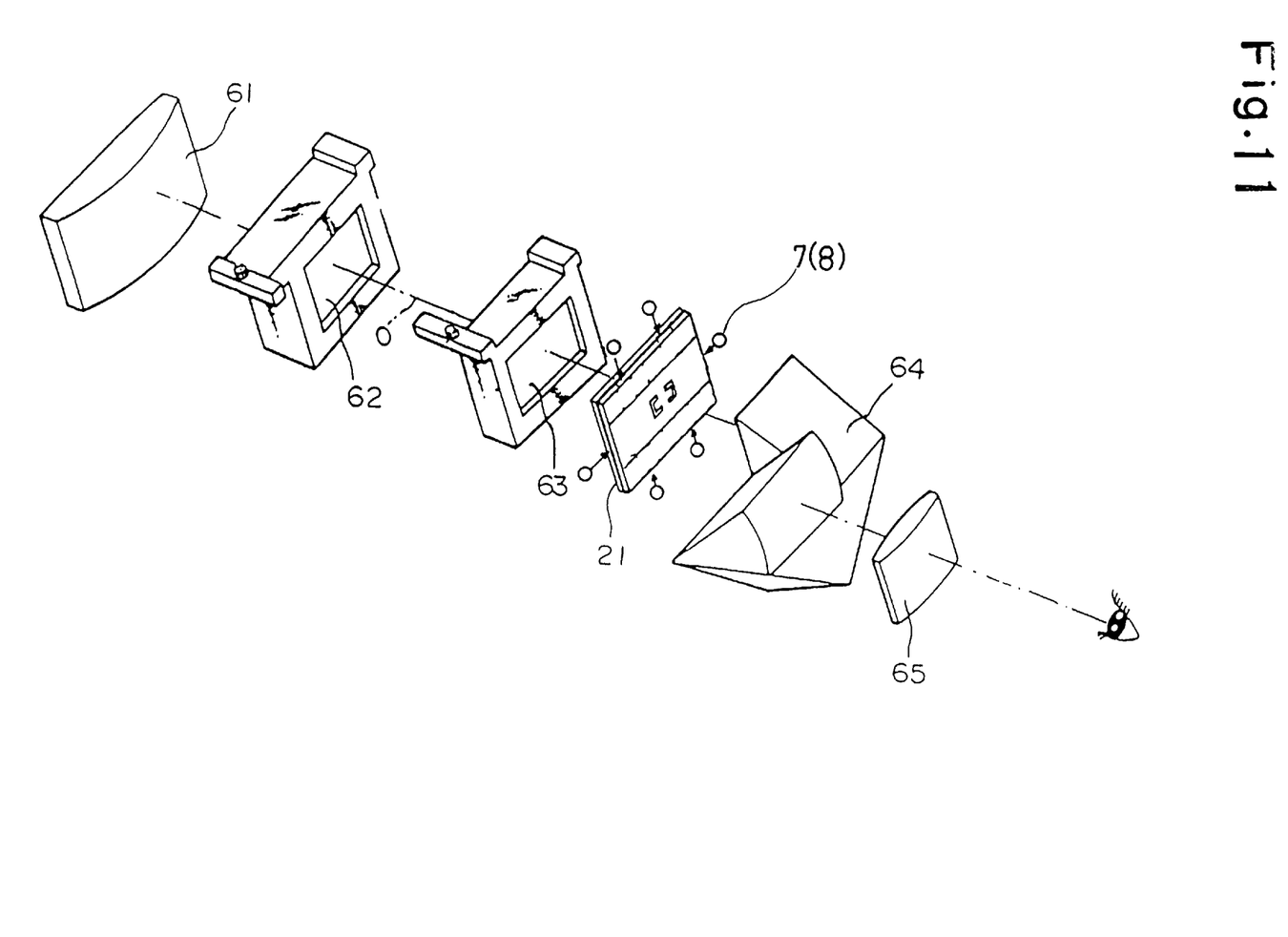
FIG. 11 is an exploded perspective view of a real image type of view finder in a compact camera having an LCD.

FIG. 11 shows an exploded perspective view of a real image type of finder in a compact camera, in which an LCD 21, similar to the LCD 1, is incorporated. In the arrangement shown in FIG. 11, the light transmitted through an objective lens, comprised of lens elements 61–63, is converged onto the LCD 21 to form an image which can be viewed by a photographer through the eyepiece 65 after passing through prism 64.

Figure 12:
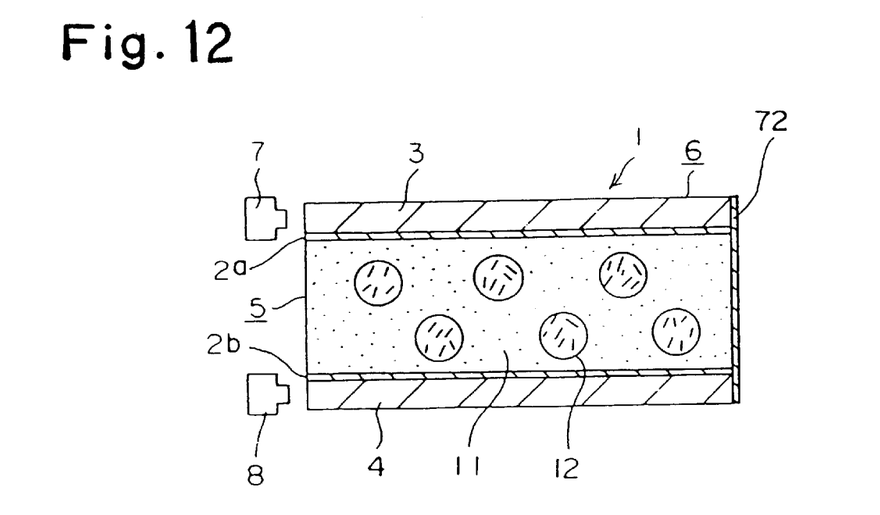
FIG. 12 is a sectional view of an LCD using a reflecting plate.

Although the light sources 7 and 8 are opposed to the glass substrates 3 and 4 in the above-mentioned embodiments, it is possible to provide the light sources on only one side of the glass substrates while maintaining a sufficient quantity of illuminating light, as shown in FIG. 12. Namely, a reflecting plate 72 is provided on the side (first side) of the LC cell 6 that is located away from the light sources 7 and 8. Consequently, the light emitted from the light sources 7 and 8 provided on the other side (second side) of the LC cell 6 and made incident upon the glass substrates 3 and 4 reaches the first side of the LC cell 6 and is reflected by the reflecting plate 72 into the glass substrates 3 and 4. Thus, the light emitted from the light sources 7 and 8 can be effectively utilized as the illuminating light, so that photographing information can be clearly indicated.

The first surfaces of the glass substrates 3 and 4 on which the reflecting plate 72 is provided are preferably made as smooth as possible to reduce the transmission loss of light thereat.

The reflecting plate 72 can be made of a metal film, such as an aluminum film, adhered to or vapor-deposited on the first side surface of the LC cell 6.

The arrangement illustrated in FIG. 12, in which the light is reflected at the end of the LC cell, can be applied to the LCD shown in FIG. 7.

In the LCD illustrated in FIGS. 1, 7 or 8, the second side surface (light incident side) of the LC cell 6 upon which the light emitted from the light sources 7, 8 or 32 is incident, is preferably made to scatter the light to some extent. To this end, the second side surface of the LC cell 6 is preferably provided with a large number of fine projections and depressions, or a light scattering plate or film can be provided on the second side surface of the LC cell. The light incident upon the liquid crystal 5 through the glass substrates or incident upon the side (end) surface of the liquid crystal 5 and reflected by the inner surfaces of the glass substrates can be uniformly distributed due to the scatter of the incident light, thus resulting in no occurrence of an irregular indication.

What is claimed is:
1. A view finder comprising:
   an objective optical system;
   an indicator provided in a vicinity of an image forming position of said objective optical system, said indicator comprising a liquid crystal cell having a pair of spaced first and second glass substrates with transparent electrodes, and a transparent macromolecular substance having a liquid crystal dispersed therein and enclosed in a space between said first and second glass substrates;

an ocular optical system through which an image formed by said objective optical system can be viewed; and at least one light source which emits light to be incident onto said indicator, said light emitted by said at least one light source being made incident onto a surface of at least one of said first and second glass substrates that extends transverse to a surface of said first and second glass substrates onto which light from said objective optical system is incident, said incident light being guided through said at least one of said first and second glass substrates, said indicator allowing light transmitted from said objective optical system to pass therethrough and be incident on said ocular optical system.

2. The view finder according to claim 1, wherein said liquid crystal is a P-type liquid crystal having a refractive index for ordinary rays substantially identical to a refractive index of said transparent macromolecular substance.

3. The view finder according to claim 1, wherein said liquid crystal is an N-type liquid crystal having a refractive index for extraordinary rays substantially identical to a refractive index of said transparent macromolecular substance.

4. The view finder according to claim 1, wherein said transparent electrodes are adhered to said first and second glass substrates and comprise a first group of electrode elements and a second group of electrode elements, respectively; and wherein said electrode elements of said first group are arrayed in a direction different from a direction in which said electrode elements of said second group are arrayed.

5. The view finder according to claim 4, wherein said electrode elements of said first group are arrayed in a direction perpendicular to said direction in which said electrode elements of said second group are arrayed.

6. The view finder according to claim 1, wherein said at least one light source is disposed in a vicinity of a side surface of said indicator, said side surface comprising said surface of at least one of said first and second glass substrates that extends transverse to said surface of said first and second glass substrates onto which light from said objective optical system is incident.

7. The view finder according to claim 1, wherein said indicator is provided, on a light incident side surface thereof that is located adjacent to said light source, with a light scattering surface.

8. The view finder according to claim 1, wherein said indicator is provided, on a side surface thereof that is located away from said light source, with a light reflecting member.

9. The view finder according to claim 8, wherein said light reflecting member comprises a metal film adhered to said side surface of said indicator that is located away from said light source.

10. The view finder according to claim 8, said light reflecting member comprising a smooth surface.

11. The view finder according to claim 1, further comprising at least one polarizing plate disposed between said light source and said surface of at least one of said first and second glass substrates that extends transverse to said surface of said first and second glass substrates onto which light from said objective optical system is incident, wherein said polarizing plate transforms a light flux passed therethrough into a linearly polarized light flux having an oscillation direction parallel to said surface of said glass substrate.

12. The view finder according to claim 1, said side surface, upon which light emitted by said light source is incident, extends along a direction of an optical axis of said objective optical system.

13. A view finder comprising:
an objective optical system;

a liquid crystal display provided in a vicinity of an image forming position of said objective optical system, said liquid crystal display comprising a pair of spaced first and second glass substrates, said glass substrates having four side surfaces in a plan view, each of said side surfaces extending transverse to a surface of said liquid crystal display upon which light from said objective optical system is incident, and a transparent macromolecular substance having a liquid crystal dispersed therein and enclosed in a space between said first and second glass substrates;

an ocular optical system through which an image formed by said objective optical system can be viewed; and at least one light source which is arranged to oppose one of said four side surfaces of said first and second glass substrates, so that light emitted from said at least one light source is made incident upon one of said four side surfaces of said first and second glass substrates, is guided through and along at least one of said first and second glass substrates and is uniformly distributed in said at least one of said first and second glass substrates, said indicator permitting light transmitted from said objective optical system to pass therethrough and be incident onto said ocular optical system.

14. The view finder according to claim 13, wherein said liquid crystal is a P-type liquid crystal having a refractive index for ordinary rays substantially identical to a refractive index of said transparent macromolecular substance.

15. The view finder according to claim 13, wherein said liquid crystal is an N-type liquid crystal having a refractive index for extraordinary rays substantially identical to a refractive index of said transparent macromolecular substance.

16. The view finder according to claim 13, wherein said view finder is a real image type view finder of a compact camera.

17. The view finder according to claim 13, wherein said view finder is a real image type view finder of a single lens reflex camera.

18. The view finder according to claim 13, further comprising transparent electrodes adhered to said first and second glass sustrates, wherein said transparent electrodes comprise a first group of electrode elements and a second group of electrode elements, respectively, and wherein said electrode elements of said first group are arrayedin a direction normal to a direction in which said electrode elements of said second group are arrayed.

19. The view finder according to claim 13, wherein said glass substrate is provided, on a side surface which has no light source, with a light reflecting member.

20. The view finder according to claim 13, further comprising at least one polarizing plate which is disposed between said at least one light source and said one of said four side surfaces of said first and second glass substrates that extends transverse to said surface of said liquid crystal display upon which light from said objective optical system is incident, wherein said polarizing plate transforms a light flux passed therethrough into a linearly polarized light flux having an oscillation direction parallel to a surface of said glass substrate.

21. The view finder according to claim 13, each of said side surfaces extends along a direction of an optical axis of said objective optical system.

* * * * *